G. R. BOTT & K. LANGNICKEL.
INTERNAL COMBUSTION ENGINE.
APPLICATION FILED MAR. 23, 1906.
920,816.
Patented May 4, 1909.
2 SHEETS—SHEET 1.
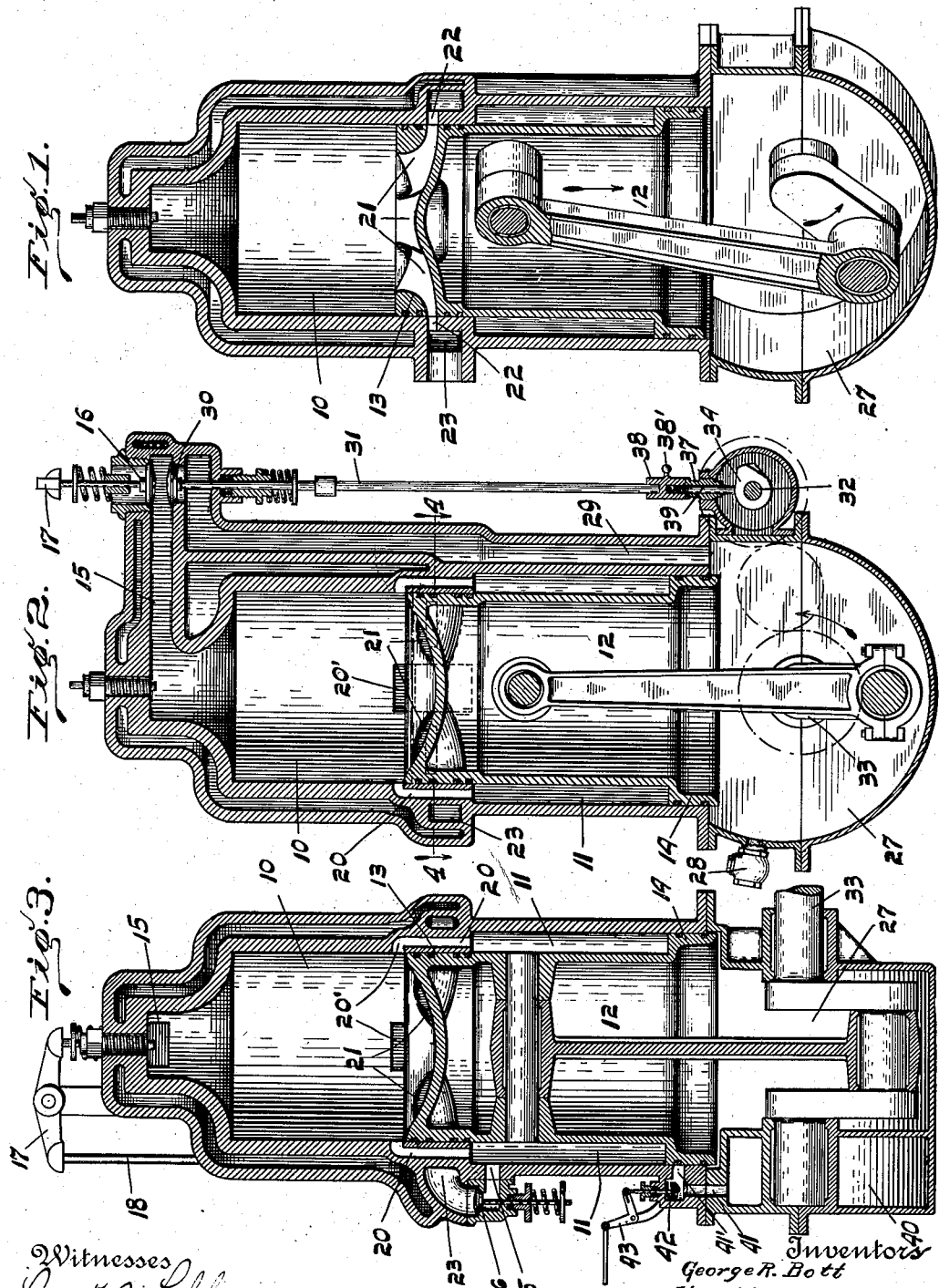
Witnesses
Frank A. Fahle
Thomas W. McMeans
Inventors
George R. Bott
Kurt Langnickel
By Bradford & Hood
Attorneys G. R. BOTT & K. LANGNICKEL.
INTERNAL COMBUSTION ENGINE.
APPLICATION FILED MAR. 23, 1906.
920,816.
Patented May 4, 1909.
2 SHEETS—SHEET 2.
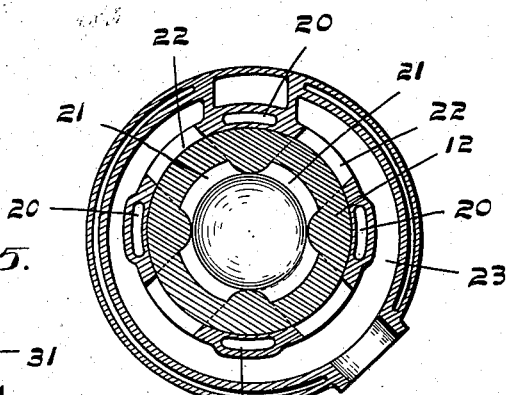
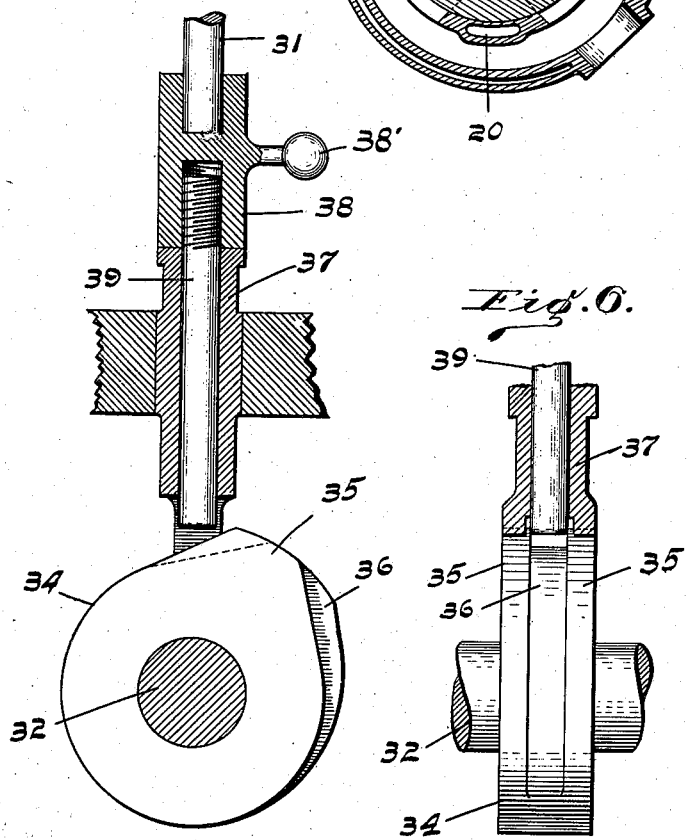
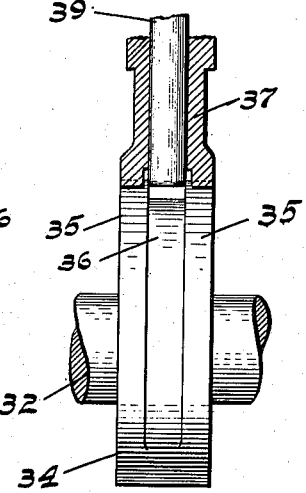
Witnesses
Frank A. Fahle
Thomas W. McMeans
Inventors
George R. Bott
Kurt Langnickel
BY Bradford & Hood
Attorneys

UNITED STATES PATENT OFFICE.

GEORGE R. BOTT AND KURT LANGNICKEL, OF INDIANAPOLIS, INDIANA.

INTERNAL-COMBUSTION ENGINE.

No. 920,816.   Specification of Letters Patent.   Patented May 4, 1909.

Application filed March 23, 1906. Serial No. 307,574.

*To all whom it may concern:*

Be it known that we, GEORGE R. BOTT and KURT LANGNICKEL, citizens of the United States, residing at Indianapolis, in the county of Marion and State of Indiana, have invented certain new and useful Improvements in Internal-Combustion Engines, of which the following is a specification.

In the operation of internal combustion engines of the two-cycle type the fresh charge is drawn into the cylinder by and into intimate association with the outgoing spent gases, and there is consequently a lessening of efficiency of the new charge due to mixture and also a possibility of premature firing.

The object of our present invention is to provide an engine, preferably of the two-cycle type, in which a separating layer of fresh air may be introduced between the outgoing spent gases and the incoming charge.

A further object of our invention is to provide means for controlling the amount of fuel supplied to the engine and the compression thereof.

A further object of our invention is to provide such improvements in details of construction as shall hereinafter be pointed out.

The accompanying drawings illustrate our invention.

Figure 1 is an axial section with the piston in position for initial exhaust; Fig. 2 a similar section 45° from Fig. 1 with the piston in position for supplemental exhaust; Fig. 3 a view similar to Fig. 2 but at right angles thereto; Fig. 4 a transverse section on line 4 4 of Fig. 2; Fig. 5 a sectional detail of the inlet valve operating mechanism, and Fig. 6 a view at right angles to Fig. 5.

In the drawings, 10 indicates a power or combustion cylinder which communicates at one end with a vacuum cylinder 11. Mounted in the two cylinders 10 and 11 is a piston 12 having a portion 13 which fits the cylinder 10 and an enlarged portion 14 which fits the cylinder 11, the difference in diameter being such that the effective volume of cylinder 11 is approximately one-half of the volume of cylinder 10. Leading into the farther end of cylinder 10 is an inlet passage 15 provided with an air inlet valve 16 positively actuated by a lever 17 and link 18.

Formed in the walls of the cylinder structure 10—11 are passages 20 which form a communication between the cylinders 10 and 11, said passages forming the ports 20' in the cylinder 10 at the end of the stroke of the inner end of portion 13 of the piston. The portion 13 of the piston is provided with transverse exhaust passages 21 which lead to the circumference of the portion 13 some distance from the inner end thereof and are adapted to register with exhaust ports 22 formed through the walls of cylinder 10 and communicating with the exhaust chamber 23. In order that the exhaust passages 21 may not register with the ports 20' we arrange the exhaust ports 22 between the ports 20'.

A passage 25 forms a communication between cylinder 11 and the exhaust passage 23 and a suitable check valve 26 is placed between so as to prevent any return of gases to the cylinder 11.

The crank base forms a compression chamber 27, with a suitable check valve 28 leading thereinto, and a passage 29 leads from the compression chamber 27 to the inlet passage 15, a valve 30 being placed between the passage 29 and passage 15. Valve 30 is carried by a suitable stem 31 which is positively actuated by suitably timed mechanism.

The speed of the engine depends upon the load and the force applied to the load and the force is proportionate to the amount of fuel supplied for any given explosion and the degree of compression. We find it possible to control the speed of the engine by controlling the time of closing of the valve 30, thus simultaneously varying the amount of charge and the degree of compression. For this purpose we provide a cam shaft 32 suitably geared to the crankshaft 33 and provided with a cam 34 having two sets of cam surfaces 35 and 36. The surfaces 35 flank the surface 36 and are adapted to be engaged by the bifurcated end of a tubular slide 37 upon which rests the lower end of an angularly adjustable sleeve 38 carried by the lower end of the valve stem 31. The lower end of the sleeve 38 is threaded to receive the threaded upper end of a pin 39 which extends through the sleeve 37 and has its lower end arranged in alinement with the cam surface 36. The cam surfaces 35 are arranged in advance of the cam 36 for a purpose which will appear.

In order to equalize the delivery of fuel through the passage 29 we provide a storage chamber 40 which communicates with the compression chamber 27 through a passage 41 ported at 41' through the wall of the cylinder 11 near the lower end thereof, the arrangement being such that, when the piston 12 is near and at the lower end of its stroke the portion 14 thereof will cut off communication between the compression chamber 27 and the storage chamber 40.

The operation is as follows: Supposing a charge to have been consumed in the cylinder 10 and the piston to be moving in the direction indicated by the arrow in Fig. 1, when the piston has reached the point shown in Fig. 1 the exhaust passages 21 of the piston will have been brought into registry with the exhaust ports 22 and the spent gases will exhaust therethrough in the manner common in two-cycle engines, the pressure within the cylinder 10 being reduced approximately to atmospheric pressure. At the same time there has been produced in the cylinder 11 a considerable vacuum. The piston then moves downward and the exhaust passages 21 are drawn downward away from the ports 22 and said ports closed. At about the time the exhaust ports 22 are closed by the inner end of the portion 13 of the piston, the ports 20' are uncovered and a portion of the remaining spent gases rush from the cylinder 10 through the passage 20 into the cylinder 11. At the time the ports 20' are uncovered the air valve 16 is opened and fresh air is drawn into the cylinder 10, the spent gases being almost entirely driven through the passages 20 by the incoming air. While the piston is moving downward a fresh charge, which has been previously drawn into the chamber 27 through valve 28, is being compressed in the chamber 27 and storage chamber 40, the passage 41 affording free communication until the end 14 of the piston 12 covers port 41. The charge in chamber 40 is thereby imprisoned therein until it is released by the upward movement of the piston. When the piston starts upward it first closes ports 20' and as soon as said ports have been closed the valve 30 is opened and a fresh charge rushes in through passage 15. As the piston continues to move upward the exhaust passages 21 come again into registry with the ports 22 and there is a slight discharge through these ports, the discharge being the remaining spent gas and some fresh air which was previously admitted through the air valve 16. As soon as the ports 22 are closed by the upward movement of the piston, port 41' is opened and the pressure in the chamber 27 is reinforced by the pressure within the storage chamber 40, thus continuing the movement of a fresh charge into the cylinder 10, this movement of the fresh charge continuing until the pressure within the chambers 27 and 40 and the cylinder 10 are equalized. If the pin 39 has been withdrawn into the sleeve 37 the cams 35 will permit the closing of the valve 30 at about the time of equalization of pressure just mentioned, and the further upward movement of the piston will produce the necessary compression of the fresh charge. If, on the other hand, the pin 37 has been projected into the path of movement of the cam 36 said cam will engage the pin and prevent the valve 30 from closing so soon, the amount of delay of closing of the valve depending upon the amount of projection of the pin 39 from the sleeve 37. Consequently a portion of the charge which has been delivered into the cylinder 10 will be forced back out of the cylinder 10 into the passage 29, thus decreasing the amount of charge and also decreasing the amount of compression of that charge. The air valve 16 need not be positively actuated but we prefer to make it in that way.

Sleeve 38 is provided with an operating arm 38' which may be connected to a speed controller governor (not shown) so that it may be automatically operated.

At high speed it is desirable to limit the volume of the compression chamber and we therefore arrange, in passage 41, a valve 42 which may be operated by any suitable means, such as a lever 43.

We claim as our invention:

1. In an internal combustion engine of the two cycle type, a main body having formed therein a combustion chamber, a vacuum chamber, a compression chamber, a secondary-exhaust passage forming a communication between the combustion chamber and vacuum chamber and closed and opened by a piston structure, primary exhaust ports leading from the combustion chamber and opened and closed by the piston in advance of the secondary-exhaust passage, and a fuel passage forming a communication between the compression chamber and the combustion chamber, a valve mounted in the fuel passage, means for positively actuating said valve, means for varying the time of closing of said valve, a valved air passage leading into the combustion chamber, and the piston structure.

2. In an internal combustion engine of the two cycle type, a main body having formed therein a combustion chamber, a vacuum chamber, a compression chamber, a secondary-exhaust passage forming a communication between the combustion chamber and vacuum chamber and closed and opened by a piston structure, primary exhaust ports leading from the combustion chamber and opened and closed by the piston in advance of the secondary-exhaust passage, and a fuel passage forming a communication between the compression chamber and the combustion chamber, a valve mounted in the fuel passage, means for positively actuating said valve, a valved air passage leading into the combustion chamber from the exterior, and the piston structure.

3. In an internal combustion engine of the two-cycle type, a main body having formed therein a combustion cylinder, a vacuum cylinder of greater diameter, a compression chamber, a ported secondary-exhaust passage forming a communication between the combustion cylinder and vacuum cylinder, an exhaust passage leading from the combustion cylinder in advance of the secondary exhaust passage, and a fuel passage leading from the compression chamber to the combustion cylinder; a piston structure having a portion fitting the combustion cylinder adapted to open and close the inner ends of the exhaust passage and secondary-exhaust passage, and also having a portion fitting the vacuum cylinder, a valve mounted in the fuel passage, means for positively actuating said valve, and a valved air passage leading into the combustion cylinder.

4. In an internal combustion engine of the two-cycle type, a main body having formed therein a combustion cylinder, a vacuum cylinder of greater diameter, a compression chamber, a ported secondary-exhaust passage forming a communication between the combustion cylinder and vacuum cylinder, an exhaust passage leading from the combustion cylinder in advance of the secondary exhaust passage, and a fuel passage leading from the compression chamber to the farther end of the combustion cylinder; a piston structure having a portion fitting the combustion cylinder adapted to open and close the inner ends of the exhaust passage and secondary-exhaust passage, and also having a portion fitting the vacuum cylinder, a valve mounted in the fuel passage, means for positively actuating said valve, and a valved air passage leading into the combustion cylinder.

5. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, and a fuel-passage leading from the compression chamber to the combustion cylinder; a piston structure having a portion fitting the combustion cylinder adapted to open and close the inner ends of the exhaust passage and secondary-exhaust passage, and also having a portion fitting the vacuum cylinder, a valve mounted in the fuel-passage, means for positively actuating said valve, means for varying the time of closing of said valve, and a valved air passage leading into the combustion cylinder.

6. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinders, an exhaust passage leading from the combustion cylinder, and a fuel-passage leading from the compression chamber to the farther end of the combustion cylinder; a piston structure having a portion fitting the combustion cylinder adapted to open and close the inner ends of the exhaust passage and secondary-exhaust passage, and also having a portion fitting the vacuum cylinder, a valve mounted in the fuel-passage, means for positively actuating said valve, means for varying the time of closing of said valve, and a valved air-passage leading into the combustion chamber.

7. In an internal combustion engine, the combination, with a combustion chamber, a vacuum chamber, a compression chamber, an exhaust passage leading from the combustion chamber, a secondary-exhaust passage forming a communication between the combustion chamber and vacuum chamber, a fuel passage between the compression chamber and combustion chamber, and an air passage leading into the combustion chamber, of mechanism for opening the several passages in the following order; first, the exhaust; second, the secondary exhaust; third, the air inlet, and, fourth, the fuel passage.

8. In an internal combustion engine of the two-cycle type, the combination, with a combustion cylinder, a vacuum cylinder, an exhaust passage leading from the combustion cylinder, a secondary-exhaust passage forming a communication between the combustion cylinder and vacuum cylinder, a compression chamber, a fuel passage between the compression chamber and combustion cylinder, and an air passage leading into the combustion cylinder, of a piston structure mounted in the combustion and vacuum chambers and adapted to open and close the exhaust and secondary exhaust, valves for controlling the fuel and air passages, and means for controlling said valves, the arrangement being such as to open the several passages in the following order; first, the exhaust; second, the secondary-exhaust; third, the air inlet, and, fourth, the fuel passage.

9. In an internal combustion engine of the two-cycle type, a main body having formed therein a combustion chamber, a vacuum chamber, a compression chamber, a secondary-exhaust passage forming a communication between the combustion chamber and vacuum chamber with an inner end closed and opened by a piston structure, primary exhaust passages leading from the combustion chamber and opened and closed by the piston in advance of the secondary-exhaust passage, and a fuel passage forming a communication between the compression chamber and the combustion chamber, a valve mounted in the fuel passage, means for positively actuating said valve, means for varying the time of closing of said valve, a valved air passage leading into the combustion chamber, and the piston structure, a storage compression chamber, and means for intermittently connecting and disconnecting said storage chamber with the fuel passage.

10. In an internal combustion engine of the two-cycle type, a main body having formed therein a combustion chamber, a vacuum chamber, a compression chamber, a secondary-exhaust passage forming a communication between the combustion chamber and vacuum chamber with an inner end closed and opened by a piston structure, primary exhaust passages leading from the combustion chamber and opened and closed by the piston in advance of the secondary-exhaust passage, and a fuel-passage forming a communication between the compression chamber and the combustion chamber, a valve mounted in the fuel passage, means for positively actuating said valve, a valved air passage leading into the combustion chamber, the piston structure, a storage compression chamber, and means for intermittently connecting and disconnecting said storage chamber with the fuel passage.

11. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, a storage compression chamber, a passage between said storage chamber and the compression chamber; and a fuel passage leading from the compression chamber to the combustion cylinder; a piston structure having a portion fitting the combustion cylinder adapted to open and close the inner ends of the exhaust passage and secondary-exhaust passage, and also having a portion fitting the vacuum cylinder adapted to open and close the passage between the two compression chambers, a valve mounted in the fuel passage, means for positively actuating said valve, and a valved air passage leading into the combustion cylinder.

12. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, a storage compression chamber, a passage between said storage chamber and the compression chamber, and a fuel passage leading from the compression chamber to the farther end of the combustion cylinder; a piston structure having a portion fitting the combustion cylinder adapted to open and close the inner ends of the exhaust passage and secondary exhaust passage, and also having a portion fitting the vacuum cylinder adapted to open and close the passage between the two compression chambers, a valve mounted in the fuel passage, means for positively actuating said valve, and a valved air passage leading into the combustion chamber.

13. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, a storage compression chamber, a passage between said storage chamber and the compression chamber, and a fuel-passage leading from the compression chamber to the combustion cylinder; a piston structure having a portion fitting the combustion cylinder adapted to open and close the inner ends of the exhaust passage and secondary-exhaust passage, and also having a portion fitting the vacuum cylinder adapted to open and close the passage between the two compression chambers, a valve mounted in the fuel-passage, means for positively actuating said valve, means for varying the time of closing of said valve, and a valved air passage leading into the combustion cylinder.

14. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, a storage compression chamber, a ported passage between said storage chamber and the compression chamber, and a fuel-passage leading from the compression chamber to the farther end of the combustion cylinder; a piston structure having a portion fitting the combustion chamber adapted to open and close the inner ends of the exhaust passage and secondary-exhaust passage, and also having a portion fitting the vacuum cylinder adapted to open and close the passage between the two compression chambers, a valve mounted in the fuel-passage, means for positively actuating said valve, means for varying the time of closing of said valve, and a valved air-passage leading into the combustion cylinder.

15. In an internal combustion engine, the combination, with a combustion chamber, a vacuum chamber, a compression chamber, an exhaust passage leading from the combustion chamber, a secondary-exhaust passage forming a communication between the combustion chamber and vacuum chamber, a fuel passage between the compression chamber and combustion chamber, a storage pressure chamber, a passage connecting the two compression chambers, and an air passage leading into the combustion chamber, of means for intermittently opening the several passages in the following order; first, the exhaust; second, the secondary exhaust; third, the air inlet, and, fourth, the fuel passage and passage between the two compression chambers.

16. In an internal combustion engine of the two-cycle type, the combination, with a combustion chamber, a vacuum chamber, an exhaust passage leading from the combustion chamber, a secondary-exhaust passage forming a communication between the combustion chamber and vacuum chamber, a compression chamber, a fuel passage between the compression chamber and combustion chamber, a storage pressure chamber, a passage connecting the two compression chambers, an air passage leading into the combustion chamber, a piston structure mounted in the combustion and vacuum chambers and adapted to open and close the exhaust and secondary exhaust, valves for controlling the fuel and air passages, and means for controlling said valves, the arrangement being such as to intermittently open the several passages in the following order; first, the exhaust; second, the secondary-exhaust; third, the air inlet, and, fourth, the fuel passage and passage between the two compression chambers.

17. In an internal combustion engine of the two-cycle type, a main body having formed therein a combustion chamber, a vacuum chamber, a compression chamber, a secondary-exhaust passage forming a communication between the combustion chamber and vacuum chamber and closed and opened by a piston structure, primary exhaust passages leading from the combustion chamber and opened and closed by the piston in advance of the secondary-exhaust passage, and a fuel passage forming a communication between the compression chamber and the combustion chamber, a valve mounted in the fuel passage, means for positively actuating said valve, means for varying the time of closing of said valve, a valved air passage leading into the combustion chamber, and the piston structure, a storage compression chamber, means for intermittently connecting and disconnecting said storage chamber with the fuel passage, and means for adjusting the effective connection between the main compression chamber and the storage chamber.

18. In an internal combustion engine of the two-cycle type, a main body having formed therein a combustion chamber, a vacuum chamber, a compression chamber, a secondary-exhaust passage forming a communication between the combustion chamber and vacuum chamber and closed and opened by a piston structure, primary exhaust ports leading from the combustion chamber and opened and closed by the piston in advance of the secondary-exhaust passage, and a fuel-passage forming a communication between the compression chamber and the combustion chamber, a valve mounted in the fuel passage, means for positively actuating said valve, a valved air passage leading into the combustion chamber, and the piston structure, a storage compression chamber, means for intermittently connecting and disconnecting said storage chamber with the fuel passage, and means for adjusting the effective connection between the main compression chamber and the storage chamber.

19. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, a storage compression chamber, a passage between said storage chamber and the compression chamber, and a fuel passage leading from the compression chamber to the combustion cylinder; a piston structure having a portion fitting the combustion chamber adapted to open and close the inner ends of the exhaust passage and secondary-exhaust passage, and also having a portion fitting the vacuum cylinder adapted to open and close the passage between the two compression chambers, a valve mounted in the fuel passage, means for positively actuating said valve, a valved air passage leading into the combustion cylinder, and means for adjusting the effective connection between the main compression chamber and the storage chamber.

20. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, a storage compression chamber, a ported passage between said storage chamber and the compression chamber, and a fuel passage leading from the compression chamber to the farther end of the combustion cylinder; a piston structure having a portion fitting the combustion chamber adapted to open and close the inner ends of the exhaust passage and secondary exhaust passage, and also having a portion fitting the vacuum cylinder adapted to open and close the passage between the two compression cylinders; a valve mounted in the fuel passage, means for positively actuating said valve, a valved air passage leading into the combustion cylinder, and means for adjusting the effective connection between the main compression chamber and the storage chamber.

21. In an internal combustion engine of the two-cycle type, a main body having formed therein a combustion cylinder, a vacuum cylinder of greater diameter, a compression chamber, a secondary-exhaust passage forming a communication between the combustion cylinder and vacuum-cylinder, an exhaust passage leading from the combustion cylinder, a storage compression chamber, a ported passage between said storage chamber and the compression chamber, and a fuel-passage leading from the compression chamber to the combustion cylinder; a piston structure having a portion fitting the combustion cylinder adapted to open and close the inner ends of the exhaust passage and secondary-exhaust passage, and also having a portion fitting the vacuum cylinder adapted to open and close the passage between the two compression chambers, a valve mounted in the fuel-passage, means for positively actuating said valve, means for varying the time of closing of said valve, a valved air passage leading into the combustion cylinder, and means for adjusting the effective connection between the main compression chamber and the storage chamber.

22. In an internal combustion engine of the two-cycle type, a main body having formed therein a combustion cylinder, a vacuum cylinder of greater diameter, a compression chamber, a secondary-exhaust passage forming a communication between the combustion cylinder and vacuum cylinder, an exhaust passage leading from the combustion cylinder, a storage compression chamber, a passage between said storage chamber and the compression chamber, and a fuel-passage leading from the compression chamber to the farther end of the combustion cylinder; a piston structure having a portion fitting the combustion cylinder adapted to open and close the inner ends of the exhaust passage and secondary-exhaust passage, and also having a portion fitting the vacuum cylinder adapted to open and close the passage between the two compression chambers, a valve mounted in the fuel-passage, means for positively actuating said valve, means for varying the time of closing of said valve, a valved air-passage leading into the combustion cylinder, and means for adjusting the effective connection between the main compression chamber and the storage chamber.

23. In an internal combustion engine, the combination, with a combustion chamber, a vacuum chamber, a compression chamber, an exhaust passage leading from the combustion chamber, a secondary-exhaust passage forming a communication between the combustion chamber and vacuum chamber, a fuel passage between the compression chamber and combustion chamber, a storage pressure chamber, a passage connecting the two compression chambers, and an air passage leading into the combustion chamber, of means for intermittently opening the several passages in the following order; first, the exhaust; second, the secondary exhaust; third, the air inlet, and, fourth, the fuel passage and passage between the two compression chambers, and means for adjusting the effective connection between the main compression chamber and the storage chamber.

24. In an internal combustion engine of the two-cycle type, the combination, with a combustion chamber, a vacuum chamber, an exhaust passage leading from the combustion chamber, a secondary-exhaust passage forming a communication between the combustion chamber and vacuum chamber, a compression chamber, a fuel passage between the compression chamber and combustion chamber, a storage pressure chamber, a passage connecting the two compression chambers, an air passage leading into the combustion chamber, a piston structure mounted in the combustion and vacuum chambers and adapted to open and close the exhaust and secondary exhaust, valves for controlling the fuel and air passages, and means for controlling said valves, the arrangement being such as to intermittently open the several passages in the following order; first, the exhaust; second, the secondary exhaust; third, the air inlet, and, fourth, the fuel passage and passage between the two compression chambers, and means for adjusting the effective connection between the main compression chamber and the storage chamber.

In witness whereof, we have hereunto set our hands and seals at Indianapolis, Indiana, this 19th day of March, A. D. one thousand nine hundred and six.

GEO. R. BOTT. [L. S.]
KURT LANGNICKEL. [L. S.]

Witnesses:
THOMAS W. McMEANS,
RUTH WORTHINGTON.